Jan. 3, 1967  A. P. KRUEGER  3,295,686
FILTER UNIT

Filed May 20, 1965  2 Sheets-Sheet 1

INVENTOR.
Albert P. Krueger
BY
Attorneys

Jan. 3, 1967          A. P. KRUEGER          3,295,686
                         FILTER UNIT
Filed May 20, 1965                         2 Sheets-Sheet 2

INVENTOR.
Albert P. Krueger
BY
    Attorneys

United States Patent Office 3,295,686
Patented Jan. 3, 1967

3,295,686
FILTER UNIT
Albert P. Krueger, Berkeley, Calif., assignor to Rockridge Laboratories, Oakland, Calif., a corporation of California
Filed May 20, 1965, Ser. No. 457,455
12 Claims. (Cl. 210—455)

This application is a continuation-in-part of application Serial No. 298,633, filed July 30, 1963 now abandoned.

This invention relates to a filter unit and more particularly to a disposable filter unit.

Heretofore in conducting filtrations and particularly when dealing with biological materials it has been necessary to assemble a filter by putting the various parts together, including the filtration medium, and then sterilizing the assembled units before use. Such filters have been relatively expensive and cumbersome, requiring a number of porcelain, glass, stainless steel or other parts. In addition to the time consuming process of assembly and sterilization before use, there is the equally time consuming and inconvenient process of cleaning the filter after use. In many instances, filtrations involve harmful bacteria so that when filtration is complete the unit must be dissembled, the filtration medium with the bacteria thereon disposed of in some way, and the unit resterilized. This involves a number of manipulative steps on the part of laboratory personnel and also involves some danger in the event the filter has been used on harmful bacteria. Further, with existing filters there is the danger of some of the liquid bypassing the filter. There is also the possibility of drawing in air when conducting vacuum filtration, causing a frothy filtrate. There is, therefore, a need for a new and improved filter unit.

In general, it is an object of the present invention to provide a filter unit which overcomes the above named disadvantages.

Another object of the invention is to provide a filter unit of the above character which is assembled ready for use without sterilization.

Another object of the invention is to provide a filter unit of the above character which is disposable.

Another object of the invention is to provide a filter unit of the above character which eliminates the danger of disposing of harmful bacteria after use.

Another object of the invention is to provide a filter unit of the above character which is relatively inexpensive and lightweight.

Another object of the invention is to provide a filter unit of the above character in which various types of filter media can be utilized.

Another object of the invention is to provide a filter unit of the above character in which a relatively rapid sterile flow can be obtained in the filter unit with a relatively low vacuum.

Another object of the invention is to provide a filter unit of the above character which can be utilized without sterilizing the vacuum tube to be connected to the filter unit.

Another object of the invention is to provide a filter unit of the above character in which leaks do not occur around the periphery of the filter medium and in which there is no chance for contaminants to be picked up as the filtrate is poured out.

Another object of the invention is to provide a filter unit which has a relatively large filter area and which will not draw in air under vacuum and which will not bypass liquid around the filter medium.

Additional objects and features of the invention will appear from the following description in which the preferred embodiments are set forth in detail in conjunction with the accompanying drawings.

Referring to the drawings.

In general, the present filter unit consists of a hollow body for the reception of a liquid to be filtered and has open upper and lower ends. A sheet-like filter medium is provided. Means is also provided for supporting the filter medium adjacent the lower end of the hollow body and forming a liquid-tight seal between the parts of the filter medium and the body. The means for supporting the filter medium includes a plurality of spaced ribs having upper surfaces laying in a plane for supporting the filter medium. The means for supporting the filter medium also includes means for receiving the filtrate passing through the filter medium and for permitting it to flow away from the filter medium after it has passed through the filter medium. In one of the embodiments of the invention, a filtrate receptacle is secured to the body to receive the filtrate as it passes through the filter medium. The receptacle is provided with a pour spout to permit the filtrate to be poured from the receptacle.

Figure 1:
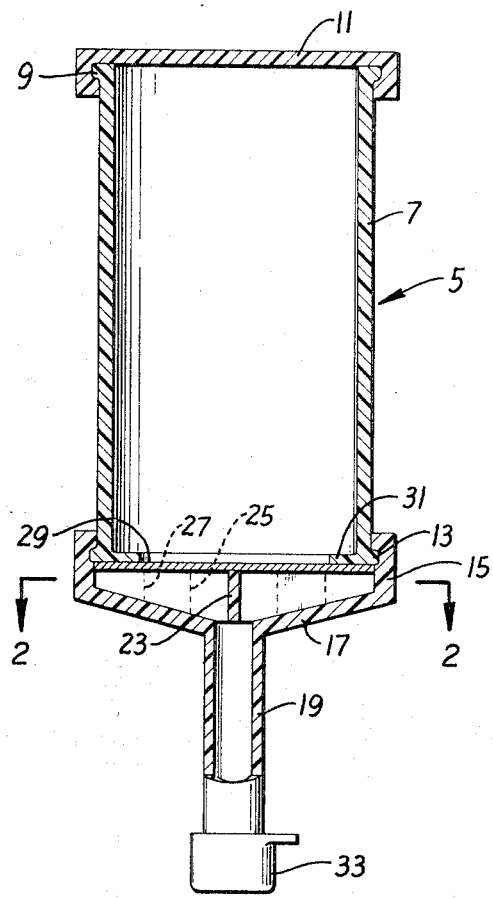
FIGURE 1 is a side elevational view partially in cross-section of a filter unit embodying the present invention adapted for either vacuum or gravity filtration.
Figure 2:
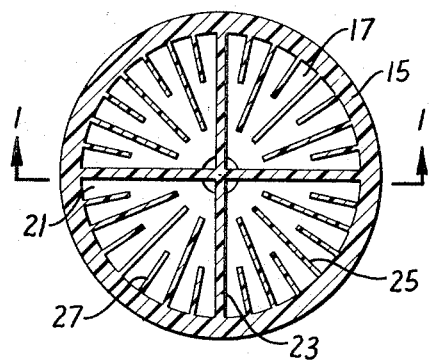
FIGURE 2 is a cross-sectional view taken along the line 2—2 of FIGURE 1.

Referring to FIGURES 1 and 2 of the drawings, there is shown an enclosed sterile filtration unit generally designated 5. The filtration unit comprises a cylindrical hollow body 7 which is open at the top and the bottom. The top portion of the body 7 has an outwardly extending lip 9 formed integral therewith so that a snap-on top or cap 11 can be retained in an airtight relationship on the body 7. A similar outwardly extending lip 13 is provided on the bottom portion of the body 7 which is utilized to retain a snap-on funnel-like member 15. The funnel-like member 15 has a conical bottom wall 17 with a tube 19 extending downwardly from the center thereof. The funnel-like member 15 also has a plurality of radially extending ribs as shown in FIGURE 2. These ribs may take the form of two ribs 21 and 23 extending diametrically of the funnel-like member 15 at right angles to each other and a plurality of shorter ribs 25 and 27 extending inwardly for different distances from the outer margin of the funnel-like member 15. The ribs 21, 23, 25, and 27 all have upper surfaces which lie in a common plane and which are adapted to support a sheet of filter medium 29. By employing ribs having a relatively small upper surface, substantially all of the area of the sheet of the filter medium 29 is available for filtration while still providing adequate support for the filter medium.

The body 7 has an inturned shoulder 31 at its bottom extremity to hold the filter medium 29 in place during transportation, storage, and use. The shoulder 31 also clamps the edge of the filter medium so that there is no chance of liquid bypassing the filter medium. A removable cap 33 is provided for sealing the end of the tube 19.

In order to use the filter unit shown in FIGURES 1 and 2 it is only necessary to remove the top cap 11 and the bottom cap 33. The tube 19 is either connected to a source of vacuum or leads into a receptacle for the filtrate. The liquid to be filtered is placed in the body 7 and is caused to move through the filter medium 29 either by gravity or by the suction applied by the vacuum. After the filtration has been completed the caps 11 and 33 may be reapplied and the entire filter unit discarded.

Figure 3:
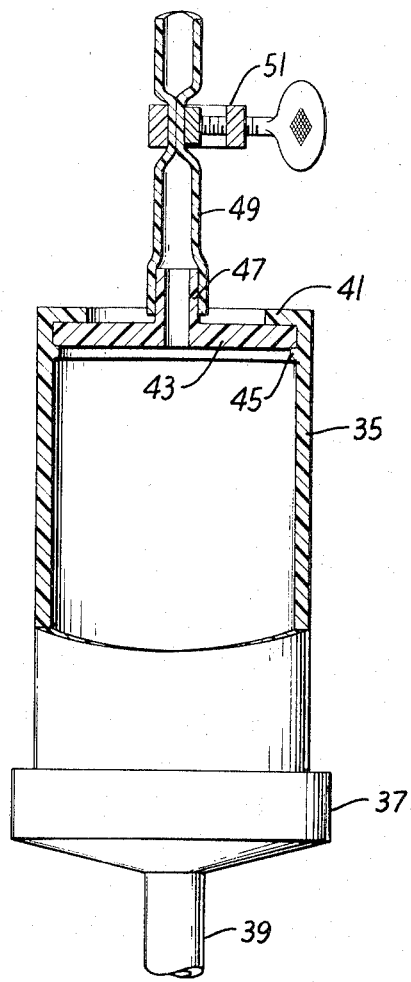
FIGURE 3 is a side elevational view partly in cross-section of another embodiment of the invention suitable for use in a pressure filtration unit.

In FIGURE 3 there is shown another embodiment of the filter unit which is particularly adapted for pressure filtration. As can be seen, it is generally similar to the filter unit shown in FIGURES 1 and 2 except for the top structure. Thus, there is provided a cylindrical body 35 with a funnel-like member 37 terminating in a tube 39. However, the top portion of the body 35 is provided with an inturned lip 41 so that a top 43 is positively held from the inside so that the unit will resist a positive pressure within the body. The body 35 is also provided with an additional small inturned lip 45 which prevents the top 43 from slipping downwardly within the body while the unit is not under pressure. A tube 47 is provided in the top 43 and has a flexible tube 49 secured thereto. A stop cock 51 is mounted on the tube 49 to keep the filter unit sterile prior to use. Alternatively, in place of the flexible tube 49 and the stop cock 51 and tube 47 may be provided with a cap similar to the cap 33 shown in FIGURE 1.

The filter unit may be made of various plastics or other suitable material such as those well known to those skilled in the art. Preferably, the filter unit is made to a relatively soft plastic so that the parts can be readily snapped together, such as polyethylene, polypropylene, or nylon. On the other hand, certain parts can be made of hard plastic. For example, the body 7 may be made of a hard acrylic resin while the end members may be of a relatively soft plastic. The filtration medium can be of any well known filtration medium known to those skilled in the art such as filter paper, asbestos, cloth, a combination of cellulose and asbestos, or the like.

Figures 4, 5, 6:
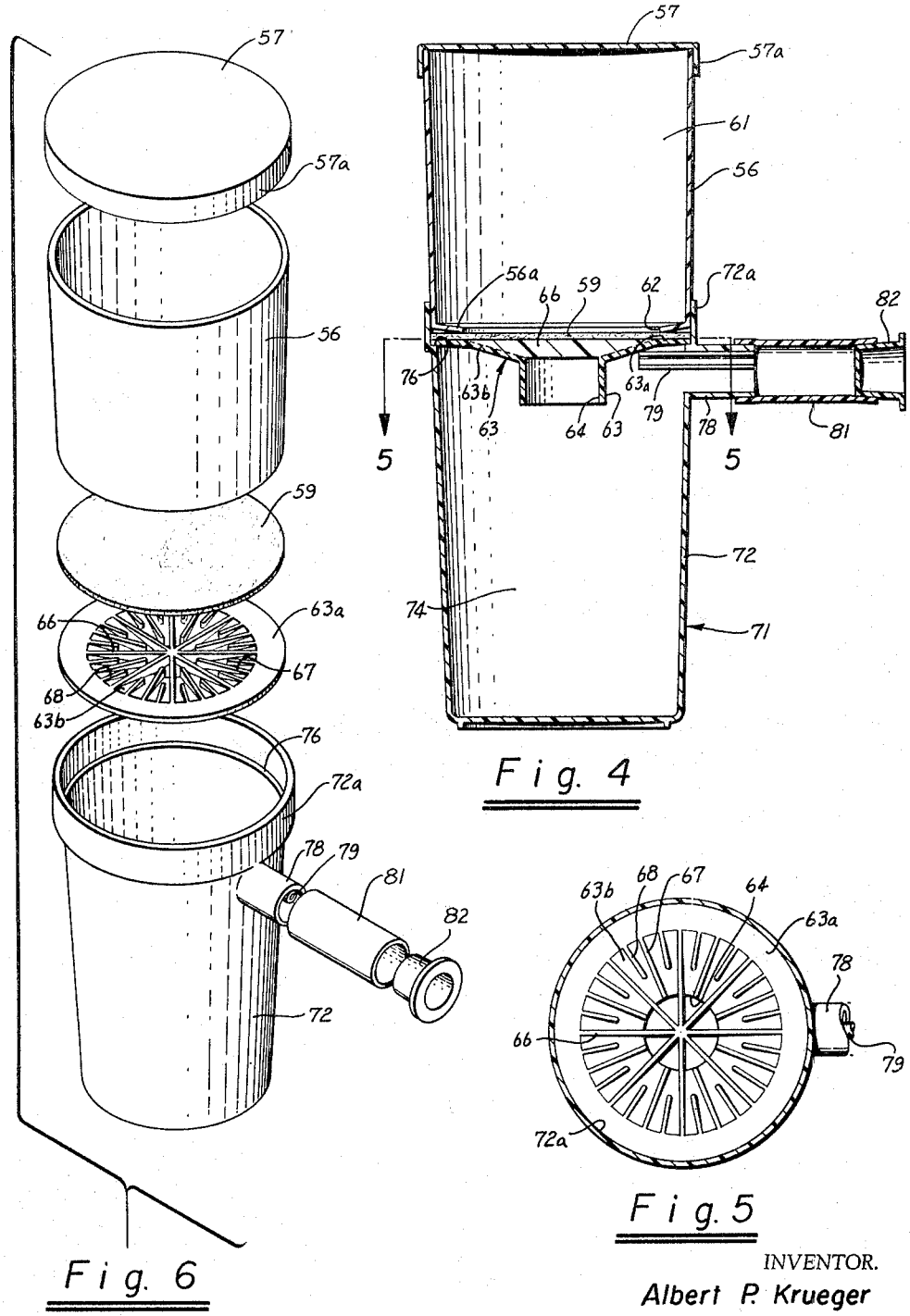
FIGURE 4 is a cross-sectional view of still another embodiment of the present invention.
FIGURE 5 is a cross-sectional view taken along the line 5—5 of FIGURE 4.
FIGURE 6 is an exploded isometric view of the filter unit shown in FIGURES 4 and 5.

Still another embodiment of the invention is shown in FIGURES 4, 5, and 6. It consists of a cylindrical hollow body 56 which has open top and bottom ends. A cover 57 is mounted on the top end of the body and is provided with a downwardly extending rim 57a which forms a slip fit with the top portion of the body 56. A filter medium in the form of a filter disc 59 is disposed adjacent the lower extremity of the hollow body 56. As can be seen particularly from FIGURE 4, the body 56 is provided with an inwardly extending annular lip portion 56a which overlies the filter disc 59. It can be seen that the body 56 forms a chamber 61 for receiving the liquid to be filtered by the filter unit. The liquid passes downwardly to the filter medium 59 through the opening 62 formed by the annular lip portion 56a. The filter medium 59 can be formed of any suitable material such as cellulose or abestos and can have any desired degree of porosity.

Means is provided for supporting the lower surface of the filter medium or disc 59 and forming a liquid-tight seal between the filter medium and the body 56 and consists of a funnel-like member 63. The funnel-like member 63 is provided with an annular rim-like portion 63a which provides a planar surface parallel to the plane of the filter medium 59 and serving to support the outer margin of the filter medium immediately underlying the lip portion 56a of the body 56. The rim-like portion 63a adjoins a conical portion 63b which extends downwardly from the plane of the rim-like portion 63a. The conical portion 63b adjoins a downwardly depending cylindrical portion 63c which is centrally disposed in the funnel-like member 63. As can be seen particularly from FIGURES 4 and 5, the cylindrical portion 63c forms an opening 64 through which the filtrate passes after passing through the filter medium 59.

The funnel-like member 63 is provided with additional means for providing adequate support for the filter medium 59 which consists of a plurality of diametrically extending ribs 66 which are displaced angularly from each other. The funnel-like member 63 is also provided with additional ribs 67 and 68 which extend radially of the funnel-like member and which are angularly displaced from each other and the ribs 66. As can be seen particularly in FIGURE 5, the ribs 67 extend from the rim-like portions 63a to the opening 64 whereas the ribs 67 and 68 do not extend to the opening 64. The ribs 66, 67 and 68 are provided with upper surfaces which lie in the same plane as the upper surface of the rim-like portion 63a and immediately underlie the filter medium 59 to support the same. As explained previously, the ribs are of a size so that the flow of the filtrate through the filter medium is not impeded substantially while at the same time providing adequate support for the filter medium.

The funnel-like member 63 and the filter medium 59, are supported by a receptacle 71 which is circular in cross-section and which has a tapered side wall 72 and a flat bottom wall 73 to provide a chamber 74 for receiving the filtrate. The upper portion of the side wall 72 is provided with a substantially cylindrical rim-like portion 72a which is adapted to receive the funnel-like member 63, the filter medium 59 and the lower extremity of the body 56. A shoulder 76 is provided in the side wall 72 for supporting the outer margin of the funnel-like member 63. It generally is preferable that the cylindrical body 56 be permanently secured to the rim-like portion 72a by suitable means such as cement so that an integral unit is formed by the body 56 and the receptacle 72 with the filter medium 59 being disposed therebetween.

Means is provided on the receptacle 71 for pouring the filtrate therefrom and consists of a slightly tapered pour spout 78 which is formed integral with the side wall 72 and opens into the chamber 74 adjacent to the upper extremity thereof but below the shoulder 76. A small tube 79 is disposed within the pour spout 78 and is secured to the upper portion thereof and extends from the end of the pour spout inwardly for a substantial distance into the chamber 74 to permit air to enter the chamber 74 when the filtrate is being poured therefrom through the spout 78. A removable sleeve 81 is secured to the pour spout 78 and has a cap 82 removably mounted therein.

As explained previously, the filter unit can be formed of any suitable material but preferably is formed of a material which is formed of a lightweight and inexpensive plastic. Thus, the filter unit can be formed either of polypropylene or polycarbonate. Polycarbonate is desirable because it is glass clear whereas polypropylene is desirable because it is more resistant chemically.

The filter unit can be of any suitable size as, for example, the body 56 and the receptacle 72 can both have sizes approximating 100 cc. If desired, the size can readily be changed from 25 cc. to 250 cc.

Use of the filter unit shown in FIGURES 4, 5, and 6 may now be briefly described. Let it be assumed that the filter unit has been preassembled as shown in FIGURES 4, 5, and 6 with the filter medium in place and also that the filter unit has been properly sterilized. When it is desired to carry out a filtration under a vacuum, the cap 82 is removed and the vacuum tube is connected to the sleeve 81. Thereafter, the cover 57 is removed and the liquid which it is desired to filter is poured into the chamber 61. The liquid passes through the filter medium 59 which serves to carry out the desired filtering operation. The liquid or filtrate which has passed through the filter medium 59 passes downwardly and is collected by the funnel-shaped member 63 where it passes through the opening 64 and drains into the receptacle 72. After the filtering has been completed, the vacuum tubing is removed from the sleeve 81 and thereafter the sleeve 81 is removed from the sleeve 81 and thereafter the sleeve 81 is removed from the pour spout 78. The filtrate can then be poured from the receptacle 72 through the pour spout which has been uncontaminated in any way so that the filtrate is recovered in a sterile condition. The small tube 79 within the pour spout 78 acts as a vent and permits air to enter the chamber 74 to thereby permit the filtrate to be poured smoothly from the receptacle 72.

After the sterile filtrate has been recovered, the sleeve 81 and the cap 82 can be replaced and the entire unit thrown away.

The construction of the filter unit is such that there is no leakage past the filter unit. In addition, no air is sucked into the filter. By securing the body 56 to the receptacle 72, it is possible to prevent re-use of the filter unit because of inability to replace the filter medium.

Although the filter unit has been shown and described as utilizing circular geometry, it is readily apparent that, if desired, any other geometry as, for example, rectangular geometry can be utilized.

It is also apparent that although the filter unit has been described as being of the disposable type, if desired the filter unit can be formed of heavier material and utilized as a re-usable unit.

It is apparent from the foregoing that I have provided a new and improved filter unit which is particularly adaptable for use as a disposable filter in that it can be readily and economically manufactured.

I claim:

1. In a disposable filter unit, a hollow body having a side wall with a vertical dimension at least as great as the longest horizontal dimension of the body for the reception of a liquid to be filtered and having open top and bottom ends, a sheet-like filter medium, means permanently connected to the bottom end of said body for supporting said filter medium adjacent the bottom end of the hollow body and forming a permanent liquid-tight seal between the outer margins of the filter medium and the bottom end of the body, said hollow body having an inwardly extending, substantially non-deformable lip overlying the filter medium and serving to permanently retain the filter medium between the body and the means supporting the filter medium, said means for supporting the filter medium having an opening below the filter medium and having a plurality of spaced ribs with upper surfaces lying in a plane for supporting the filter medium and permitting the filtrate which has passed through the filter medium to pass downwardly therefrom through said opening.

2. A filter unit as in cliam 1 wherein said means for supporting said filter medium includes a receptacle and means for permanently securing said receptacle to said body so that the filtrate passing through the filter medium flows into the receptacle, said receptacle having a side wall and a pour spout mounted in the side wall.

3. A filter unit as in claim 2 together with a tube mounted in the pour spout at the upper portion thereof and extending inwardly into the receptacle.

4. A filter unit as in claim 2 together with a sleeve mounted on the pour spout and a cap mounted on the outer end of the sleeve.

5. A filter unit as in claim 1 together with a cover mounted on the upper portion of the body and serving to close the top end of the body.

6. In a disposable filter unit, a hollow body for the reception of a liquid to be filtered and having open top and bottom ends, a sheet-like filter medium disposed adjacent the bottom end of the body, a funnel-like member underlying the filter medium and supporting said filter medium, means forming a permanent liquid-tight seal between the outer margin of the filter medium, the funnel-like member and the bottom end of the body, said funnel-like member having an opening below the filter medium, a receptacle for receiving a filtered liquid mounted on the body below the funnel-like member, and means permanently connecting said body to said receptacle, said receptacle being provided with a shoulder and said funnel-like member resting upon said shoulder.

7. A filter unit as in claim 6 wherein said receptacle has a side wall together with a pour spout mounted in the side wall.

8. A filter unit as in claim 7 together with a sleeve mounted on said pour spout, a removable cap closing the end of said sleeve and a cap closing the top of said body.

9. A filter unit as in claim 7 together with a small tube mounted in said pour spout in the upper portion thereof and extending inwardly into the receptacle.

10. In a filter unit, a hollow body for the reception of a liquid to be filtered and having open top and bottom ends, a sheet-like filter medium disposed adjacent the bottom end of the hollow body, a funnel-like member underlying the filter member and supporting said filter medium in a position adjacent the bottom end of the hollow body, means forming a liquid-tight seal between the outer margin of the filter medium and the funnel-like member and the bottom end of the body, said funnel-like member having an opening below the filter medium, a receptacle mounted below the filter medium, means forming a permanent connection between the hollow body and the receptacle and means forming a liquid-tight seal between the receptacle and the funnel-like member and said filter medium, said receptacle being formed with a side wall and a pour spout mounted in the side wall to permit a liquid to be poured from said receptacle through said pour spout.

11. A filter unit as in claim 10 together with a sleeve mounted on said pour spout and a removable cap closing the end of said sleeve.

12. A filter unit as in claim 10 together with a small tube mounted in said pour spout on the upper portion thereof and extending inwardly into the receptacle.

References Cited by the Examiner

UNITED STATES PATENTS

| | | | |
|---|---|---|---|
| 321,228 | 6/1885 | Law | 210—455 |
| 966,963 | 8/1910 | Steinkoenig | 210—455 X |
| 2,449,238 | 9/1948 | Lightfoot | 210—455 X |
| 2,584,206 | 2/1952 | Hodson | 210—498 X |
| 2,781,312 | 2/1957 | Klumb et al. | 210—416 X |
| 2,818,178 | 12/1957 | Hodson | 210—455 X |
| 3,085,689 | 4/1963 | Hering et al. | 210—232 |
| 3,173,868 | 3/1965 | Blomquist | 210—445 |
| 3,206,033 | 9/1965 | Kern | 210—482 X |

FOREIGN PATENTS 351,704   4/1922   Germany.

OTHER REFERENCES

Modern Laboratory Appliances, 1942, Fisher Scientific Co. et al., pp. 231–233.

REUBEN FRIEDMAN, *Primary Examiner.*

SAMIH N. ZAHARNA, C. DITLOW,
*Assistant Examiners.*